United States Patent [19]
Miller et al.

[11] 3,874,219
[45] Apr. 1, 1975

[54] TOOTH FORMING TOOL

[75] Inventors: Robert L. Miller, Warren; Louis M. Fisset, Roseville, both of Mich.

[73] Assignee: Ex-Cell-O Corporation, Highland Park, Mich.

[22] Filed: June 22, 1973

[21] Appl. No.: 372,475

[52] U.S. Cl. .................................................. 72/469
[51] Int. Cl. .............................................. B21h 5/02
[58] Field of Search .......................... 72/469, 88, 90

[56] References Cited
UNITED STATES PATENTS

| | | | |
|---|---|---|---|
| 440,763 | 11/1890 | Simonds | 72/88 |
| 3,015,243 | 1/1962 | Drader | 72/469 |
| 3,084,572 | 4/1963 | Starck | 72/88 |
| 3,169,419 | 2/1965 | Clerk | 72/469 |
| 3,672,203 | 6/1972 | Anderson | 72/469 |
| 3,818,736 | 6/1974 | Blue | 72/88 |

*Primary Examiner*—Milton S. Mehr
*Attorney, Agent, or Firm*—Malcolm R. McKinnon

[57] ABSTRACT

A tool for pressure generating teeth on the periphery of a cylindrical workpiece, the tool having teeth thereon having an improved configuration which increases the strength of the teeth on the tools and increases the useful life of the tools.

2 Claims, 6 Drawing Figures

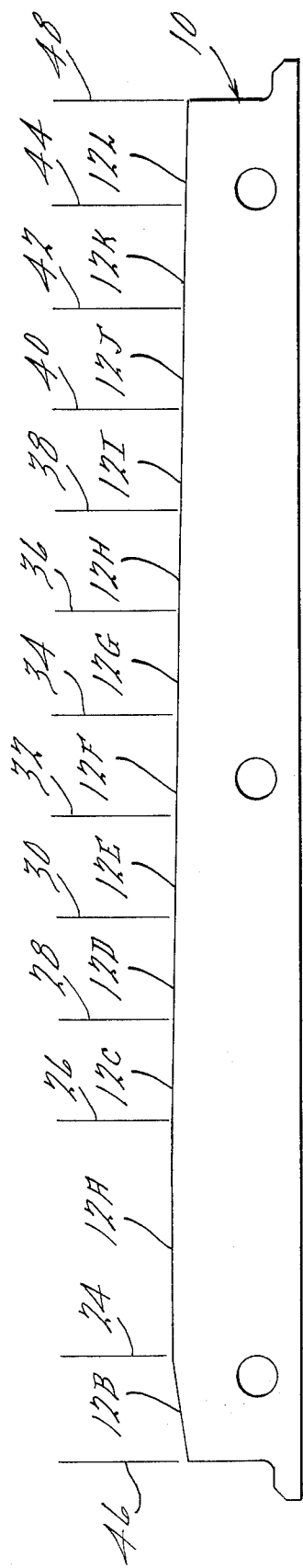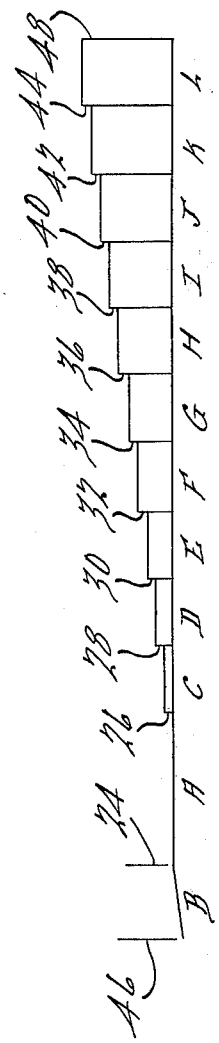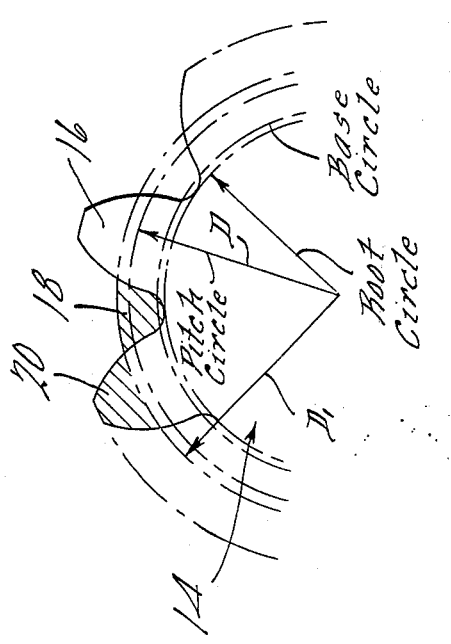

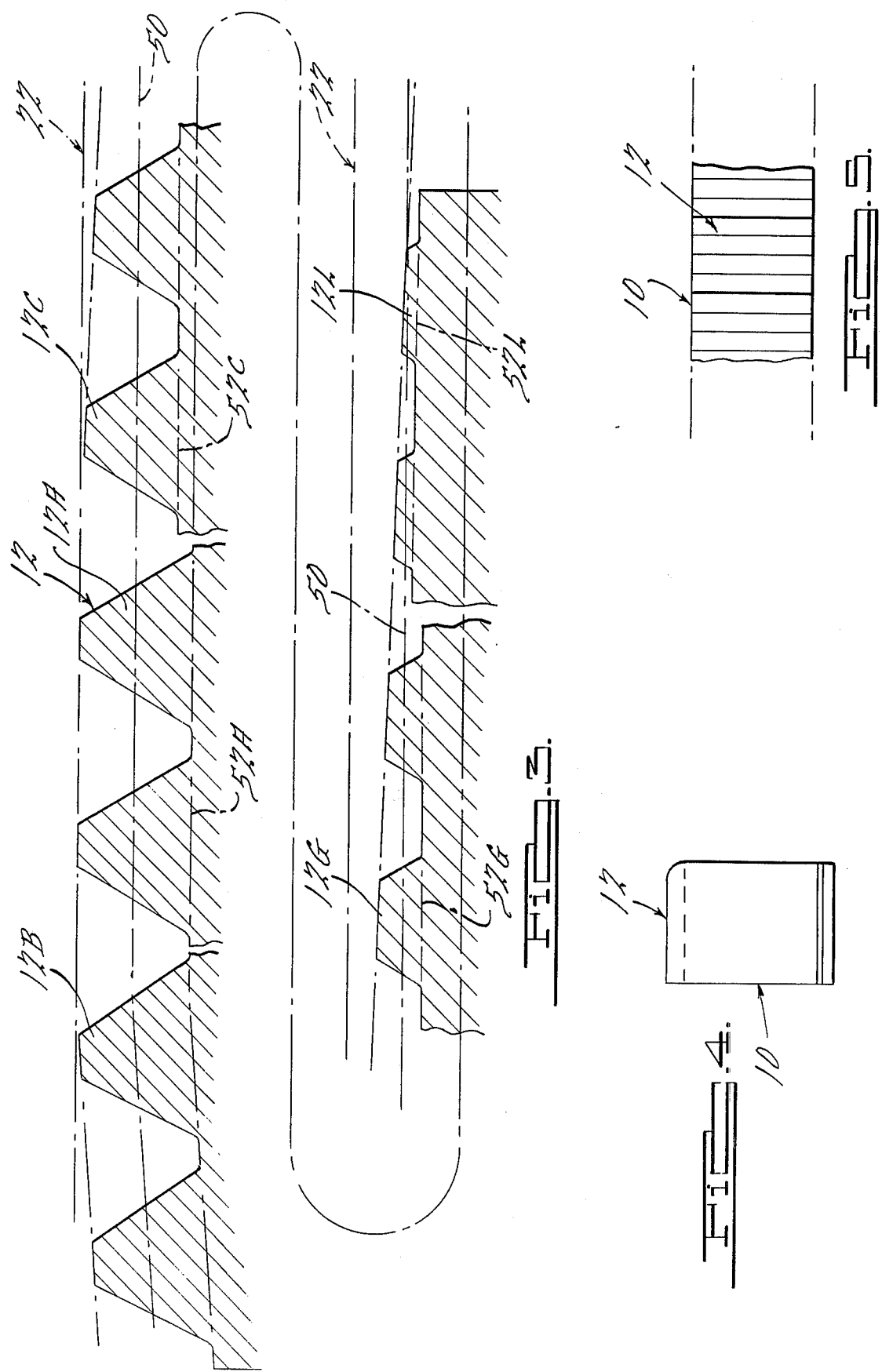

TOOTH FORMING TOOL

BRIEF SUMMARY OF THE INVENTION

This invention relates to tools for pressure generating toothed elements and, more particularly, to an improved tool for pressure generating teeth, such as spline teeth, gear teeth, worm teeth and the like, on the periphery of cylindrical workpieces while the workpieces are at ambient or room temperature and without removal of material from the workpieces. Heretofore, various tools have been utilized commercially to pressure form spline teeth, gear teeth, worm teeth and the like on the periphery of a cylindrical workpiece while the workpiece is at ambient or room temperature without removing material from the workpiece. Examples of prior art tools which have achieved commercial success in this field are disclosed in U.S. Pat. Nos. 2,994,237 and 3,015,243, such tools being utilized, for example, in machines of the type disclosed in U.S. Pat. No. 2,995,964.

An object of the present invention is to provide an improved tooth forming tool of the indicated character incorporating teeth having an improved configuration which increases the strength of the teeth and the useful life of the tools.

Another object of the invention is to provide an improved tool for pressure generating toothed elements which enables the quantity production of toothed elements with improved quality at reduced cost.

Still another object of the invention is to provide an improved tool for pressure generating toothed elements which tool has an improved tooth configuration that is economical and commercially feasible to manufacture, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a side elevational view of a rack type tool embodying the present invention;

FIG. 2 is a fragmentary view of a typical involute spline that can be pressure formed by tools embodying the present invention;

FIG. 3 is an enlarged, fragmentary and diagrammatic side elevational view of the teeth of the tool illustrated in FIG. 1;

FIG. 4 is an elevational view of the left end of the tool illustrated in FIG. 1;

FIG. 5 is a fragmentary, top plan view of the tool illustrated in FIG. 1; and

FIG. 6 is a diagram illustrating the root lines of the teeth of the tool illustrated in FIG. 1.

DETAILED DESCRIPTION

Referring to the drawings, a preferred embodiment of the invention is illustrated in FIGS. 1, 3, 4 and 5 thereof. The illustrated embodiment of the invention comprises a specific tooth construction for rack type tools generally designated 10, which tools are preferably utilized in identical pairs to pressure form involute spline teeth, involute gear teeth and the like, as well as other types of teeth on the periphery of a cylindrical workpiece. A machine in which a pair of rack type tools embodying the present invention may be utilized to pressure generate teeth on a workpiece by metal displacement is described in detail in the aforementioned U.S. Pat. No. 2,995,964 although it will be understood that tools embodying the present invention may be utilized in other types of machines. In general, a workpiece is positioned between a pair of tools 10 embodying the present invention, the tools being reciprocated in opposite directions across the workpiece to form teeth on the periphery of the workpiece. The workpiece is preferably supported by means which permit it to rotate freely about the longitudinal axis of the workpiece when urged to do so by tools embodying the present invention. The tools 10 are provided with teeth, generally designated 12, on their working faces that engage the periphery of the workpiece and, in use, the tools are moved lengthwise by suitable means effective to move the tools simultaneously in opposite directions at the same velocity. The space between the working faces of the tools is less than the diameter of the workpiece with the result that the configuration of the working faces of the tools is impressed or conjugated on the periphery of the workpiece.

In forming teeth of the desired configuration on the periphery of the workpiece, the material from which the workpiece is made (ordinarily steel) will flow adjacent the surface in radial and tangential directions so that there are grooves of less diameter than the original outside diameter of the workpiece and ridges of greater diameter than the original outside diameter of the workpiece. Since the final configuration of the workpiece must be accurately maintained, this flow of material should be taken into account in selecting the diameter of that portion of the workpiece which is subjected to the action of the tools embodying the present invention.

To illustrate by consideration of a common but very important shape that may be rolled by tools embodying the present invention, there is shown in FIG. 2 a portion of a cross-section of a workpiece 14 in finished form in which the workpiece has involute teeth or splines 16. Since no metal is removed in the cold rolling operation, the diameter of the workpiece prior to rolling cannot be either the final outside diameter or the root diameter. The rolling diameter $D_1$ of the workpiece 14 is selected so that the area 18 of removed tooth material below the $D_1$ periphery is equal to the area 20 of tooth material on a greater diameter than $D_1$. The diameter $D_1$, or substantially this diameter, defines the pitch line for rack tupe tools such as the tools 10. As will be described hereinafter in greater detail, the pressure angle or angle of obliquity of certain of the teeth of the tools 10 is the angle whose cosine is $D/D_1$ multiplied by the cosine of the pressure angle at the pitch diameter of the teeth 16 where D is the pitch diameter of the workpiece 14. The base pitch of the tools and the workpiece is identical. With such a construction, the linear pitch of the teeth on the tool, as measured on the pitch line thereof, corresponds with the circular pitch of the teeth on the workpiece, as measured on a circle having the diameter $D_1$ of the workpiece. The whole depth of at least some of the teeth on the tools 10 which engage the workpiece 14 is preferably the same as that of the workpiece, i.e., such tool teeth are fully conjugate to the teeth on the workpiece.

In use, a pair of tools 10 are spaced apart so that at a position near the trailing ends thereof, the working faces of the tools provide clearance equal to the root diameter of the workpiece 14 less a few thousandths of an inch to take up elasticity of the members and compression of oil films under rolling pressure. Only one pass of the tools with no reversal of direction during the working stroke is preferred.

The spacing of the working faces of the tools is regulated so that the depth of the impressions made in the workpiece gradually increases as the rolling operation proceeds. That is to say the working faces approach closer together toward the longitudinal axis of the workpiece as the length of the stroke increases. This "approach" may be regarded as the feed of the tools into the workpiece as the tools move relative to the workpiece. In the embodiment of the invention illustrated, the convergence of the tool faces toward each other is accomplished by gradually increasing the height of the tool teeth while maintaining the pitch line of all sections of the tool teeth from the leading end of the tool to the section containing the fully conjugate teeth constant, a divergent section of the teeth being provided between the section containing the fully conjugate teeth and the trailing end of the tool to provide relief at the end of the working stroke of the tool.

FIGS. 1, 3, 4 and 5 illustrate a tool 10 embodying the present invention, it being understood that the tooth formation of the mating tool will be substantially identical. The numeral 22 designates a theoretical reference line which shows a "no taper" condition so that if the tops of the teeth on the tool remained on the line 22 there would be no change in spacing between the working faces of the tools as the tools moved relative to each other across the periphery of the workpiece. The teeth of the tool 10 are designated generally by the numeral 12, and, in the preferred embodiment of the invention illustrated, the teeth 12 are divided into twelve sections delineated by the vertical reference lines 24, 26, 28, 30, 32, 34, 36, 38, 40, 42, and 44 and the trailing and leading ends 46 and 48, respectively, of the tool. As shown in FIG. 3, the pitch line 50 of the tool teeth 12 is parallel to the reference line 22 from the leading end 48 of the tool 10 to the reference line 24, and the pitch line of the tool teeth 12 tapers downwardly away from the reference line 22 from the reference line 24 to the trailing end 46 of the tool. The tops of the tool teeth in the sections between the reference line 26 and the leading end 48 of the tool taper downwardly toward the leading end of the tool while the pitch line of the teeth in the sections of the teeth between the reference line 24 and the leading end 48 of the tool remains parallel to the reference line 22. In accordance with the teaching of U.S. Pat. No. 3,015,243, the teeth 12A between the reference lines 24 and 26 are full sized and fully conjugate to the teeth to be formed on the workpiece and the pressure angle or angle of obliquity of the teeth 12A is the angle whose cosine is $D/D_1$ multiplied by the cosine of the pressure angle at the pitch diameter of the teeth to be formed on the workpiece where D is the pitch diameter of the teeth of the workpiece. The teeth 12A between the reference lines 24 and 26 conjugate the final form of the teeth on the workpiece. Also, in accordance with the teachings of U.S. Pat. No. 3,015,243, and as previously mentioned, the pitch line of the teeth 12B between the reference line 24 and the trailing end 46 of the rack tapers downwardly away from the reference line 22 and the teeth 12B between the reference line 24 and the trailing end 46, while being substantially full-sized, are also relieved on the sides or flank faces thereof. This relief eliminates seam lines and other errors that might otherwise be formed on the teeth of the workpiece at the end of the stroke due to the decreased total area of the contact between the tools and the workpiece as the rolling pressures are reduced at the end of the stroke.

In accordance with the present invention, the pitch line of all of the teeth on the tool between the reference line 24 and the leading end 48 of the tool is determined by the diameter $D_1$ of the workpiece in the manner previously described so that the linear pitch of the teeth on the tool, as measured on the pitch line thereof, corresponds with the circular pitch of the teeth on the workpiece as measured on a circle having the diameter $D_1$ of the workpiece. As previously mentioned, the pressure angle of the full-sized teeth 12A between the reference lines 24 and 26 is the angle whose cosine is $D/D_1$ multiplied by the cosine of the pressure angle at the pitch diameter of the teeth on the workpiece where D is the conventional pitch diameter of the workpiece. The base pitch of the tools and the workpiece is identical. With such a construction, the linear pitch of the teeth on the tool, as measured on the pitch line thereof, corresponds with the circular pitch of the teeth on the workpiece as measured on a circle having the diameter $D_1$ of the workpiece. The whole depth of the teeth 12A between the reference lines 24 and 26 is preferably the same as that of the workpiece so that the teeth 12A are fully conjugate to the teeth on the workpiece.

In the embodiment of the invention illustrated, between the leading end 48 of the tool and the reference line 26, the tool working face is divided into sections designated 12C through 12L, the teeth in the section 12L initially gripping the workpiece and initiating its rotation. In use, the teeth 12L in the mating tools are spaced apart by a distance slightly less than the rolling diameter $D_1$ of the workpiece, as for example, the teeth 12L of the mating tools may be spaced apart a few thousandths of an inch less than the diameter $D_1$ of the workpiece.

The linear pitch of the teeth in the sections 12C through 12L is identical with the linear pitch of the teeth in the section 12A of the rack. The number of teeth in each of the sections 12C through 12L is preferably one-half the number of teeth in the workpiece, i.e., if there are twenty teeth in the workpiece, there will be ten teeth in each section 12C through 12L of the tool between the reference line 26 and the leading end 48 of the tool. It will be understood that a fewer or greater number of sections may be provided depending upon the size and number of the teeth in the workpiece.

It will be noted that reference line 22 is tangent to the tops of the full-sized teeth 12 in the section of teeth on the tool between the reference lines 24 and 26. The reference line 52A is parallel to the reference line 22 and is tangent to the roots of the teeth 12A between the reference lines 24 and 26. In accordance with the present invention, and as shown in FIG. 3, the root line 52C of the teeth 12C is disposed above the root line of the teeth 12A with the result that the teeth 12C have a slightly modified addenda and a slightly modified dedenda as compared with the full-sized teeth 12A. For example, the root 52C of the teeth 12C may be disposed 0.002 inches above the root line 52A of the teeth 12A and the root lines of the teeth in each successive section may be disposed 0.002 inches above the root line of the teeth in the preceding section in the direction toward the full height teeth.

Also, as shown in FIG. 3, the top lands of the teeth 12C slope downwardly toward the pitch line and are disposed below the top lands of the teeth 12A. Thus, the top lands of the teeth 12D through 12L are also disposed below the top lands of the teeth in the preceding sections. At the same time, in accordance with the present invention, the root lines of the teeth 12C through 12L are disposed above the root lines of the teeth in the preceding sections of teeth progressing toward the full-sized teeth 12A. The chordal thickness of the teeth 12C through 12L, as measured on the pitch line thereof, is constant progressing fom the teeth 12C toward the full-sized teeth 12A while the distance between the teeth of successive sections, as measured on the pitch line, is also constant progressing from the teeth 12L toward the teeth 12A.

Thus, it will be seen that the root lines of the teeth in each successive section are progressively lowered from the leading end 48 of the tool to the full height teeth 12A while the top lands of the teeth in each successive section slope upwardly from the leading end 48 to the line 22 defining the top lands of the full height teeth 12A.

FIG. 6 is illustrative of the relationship of the stepped root lines of the various sections of the teeth 12 of the tool. Such a construction increases the strength of the teeth 12C through 12L which perform the greatest amount of work during the tooth forming operation. In effect, such teeth are double truncated as compared with the full sized teeth 12A. At the same time, deflection under load is reduced, thereby reducing the fatigue stresses imposed on the teeth of the tool and increasing the useful life of the tool.

In use, the teeth 12L of the tool initially engage and penetrate the workpiece slightly to initiate rotation thereof. The teeth 12K, 12J, 12I, 12H, etc. then successively engage the workpiece and generate partial involute tooth configuration, which partial involute configuration is then gradually modified by the teeth in each successive section until the teeth 12A generate the full involute tooth configuration in the workpiece.

If desired, one or both of the top corners of the tool 10 may be provided with a chamfer or a radius, to eliminate the necessity of undercutting the workpiece. FIG. 5 illustrates a plan view of the teeth 12 when such teeth are intended to generate spur teeth on the workpiece. It will be seen that the tool teeth are perpendicular to the sides of the tool, i.e., perpendicular to the direction of tool movement. It will be understood that if the tools are to generate helical teeth on the workpiece, the tool teeth will be inclined to the sides of the tool or direction of tool movement.

While a preferred embodiment of the invention has been illustrated and described, it will be understood that various changes and modifications may be made without departing from the spirit of the invention.

What is claimed is:

1. A tool for pressure forming teeth on the periphery of a cylindrical workpiece, said tool including a body having a leading end and a trailing end and provided with a working face having a plurality of teeth thereon, said teeth being divided into sections each containing a multiplicity of teeth, all of said teeth having a common pitch line, a first section of said teeth being disposed between said leading end and said trailing end, each of said teeth in said first section having a configuration conjugate to the configuration of the teeth to be formed on the workpiece, a plurality of additional sections of teeth disposed between said leading end and said first section of teeth, each of said teeth in each of said sections including planar leading and trailing flank surface portions, each of said teeth in said additional sections including a planar top land the top lands of the teeth in said additional sections being disposed intermediate the top lands of the teeth in said first section and said pitch line, the root lines of the teeth in said additional sections being stepped and disposed intermediate the root line of the teeth in said first section and said pitch line, the tooth thickness of all of said teeth in all of said sections as measured in the pitch line thereof being constant from section to section from the teeth in said first section to said leading end, the distance between the teeth in successive sections as measured on the pitch line thereof being constant progressing from said leading end to said first section of teeth.

2. A tool for pressure forming teeth on the periphery of a cylindrical workpiece, said tool being provided with a working face having teeth thereon and including a leading end and a trailing end, said teeth being divided into sections each containing a multiplicity of teeth, all of said teeth having a common pitch line, a first section of teeth between said leading end and said trailing end being fully conjugate to the teeth to be formed on said workpiece, a plurality of additional sections of teeth disposed between said first section of teeth and said leading end, the addenda and dedena of the teeth in said additional sections progressively decreasing in height from said first section of teeth to said leading end, each of said teeth in each of said sections including planar leading and trailing flank surface portions, each of said teeth in said additional sections including a planar top land the top lands of the teeth in said additional sections being disposed in a plane sloping toward said leading end, the root lines of the teeth in said additional sections being progressively stepped in equal increments from section to section above the root lines of the teeth in the preceding sections disposed toward the teeth in said first section, the tooth thickness of all of the teeth in all of said sections as measured on the pitch line thereof being constant from section to section from the teeth in said first section to said leading end the distance between the teeth in successive sections as measured on the pitch line thereof being constant progressing from said leading end to said first section of teeth.

* * * * *